US011262928B2

(12) United States Patent
Muthiah (10) Patent No.: US 11,262,928 B2
(45) Date of Patent: Mar. 1, 2022

(54) STORAGE SYSTEM AND METHOD FOR ENABLING PARTIAL DEFRAGMENTATION PRIOR TO READING IN BURST MODE

(71) Applicant: Western Digital Technologies, Inc., San Jose, CA (US)

(72) Inventor: Ramanathan Muthiah, Karnataka (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/899,992

(22) Filed: Jun. 12, 2020

(65) Prior Publication Data

US 2021/0389876 A1 Dec. 16, 2021

(51) Int. Cl.
*G06F 3/06* (2006.01)
*G06F 12/10* (2016.01)

(52) U.S. Cl.
CPC ............ *G06F 3/064* (2013.01); *G06F 3/0604* (2013.01); *G06F 3/0659* (2013.01); *G06F 12/10* (2013.01)

(58) Field of Classification Search
CPC ........ G06F 3/064; G06F 12/10; G06F 3/0604; G06F 3/0659
USPC ........ 707/813, 693; 711/154, 170, 103, 167; 365/233.18
See application file for complete search history.

(56) References Cited

U.S. PATENT DOCUMENTS

| | | | |
|---|---|---|---|
| 9,471,254 B2 | 10/2016 | Shaharabany et al. | |
| 9,569,352 B2 | 2/2017 | Marcu et al. | |
| 10,739,996 B1* | 8/2020 | Ebsen | G06F 3/064 |
| 2003/0137885 A1 | 7/2003 | Roohparvar | |
| 2010/0287217 A1* | 11/2010 | Borchers | G06F 12/0246 707/813 |
| 2010/0312983 A1 | 12/2010 | Moon et al. | |
| 2014/0215227 A1 | 7/2014 | Svasubramanian et al. | |
| 2017/0068451 A1 | 3/2017 | Kenan et al. | |
| 2017/0228191 A1* | 8/2017 | Sun | G06F 3/0652 |
| 2017/0286286 A1* | 10/2017 | Szubbocsev | G06F 3/0688 |
| 2018/0107593 A1 | 4/2018 | Ogawa | |
| 2019/0138499 A1 | 5/2019 | Dryfoos et al. | |
| 2020/0401515 A1* | 12/2020 | Liang | G11C 16/10 |

FOREIGN PATENT DOCUMENTS

JP 2007 076063 A 3/2007

OTHER PUBLICATIONS

International Search Report completed Apr. 22, 2021 for International Application No. PCT/US2021/016517.
Written Opinion completed Apr. 22, 2021 for International Application No. PCT/US2021/016517.
Israel Patent Office Search Strategy completed Apr. 22, 2021 for International Application No. PCT/US2021/016517.

* cited by examiner

*Primary Examiner* — Hong C Kim
(74) *Attorney, Agent, or Firm* — Crowell & Moring LLP (57) ABSTRACT

A storage system and method for enabling partial defragmentation are provided. In one embodiment, a storage system comprises a memory and a controller. The controller is configured to receive an indication from a host that the host will be reading from a portion of the memory in a burst mode; determine whether a fragmentation level of the portion of the memory is above a threshold; and in response to determining that the fragmentation level of the portion of the memory is above the threshold, perform a defragmentation of the portion of the memory prior to reading data stored in the portion of the memory. Other embodiments are provided.

20 Claims, 6 Drawing Sheets

Typical host sequential write and burst read
(Data physically together for the initial few device cycles)

FIG. 4B

Device data fragmented after multiple cycles

Fragmented data

FIG. 4C

Partially-defragmented data state after multiple cycles and a host heads-up for Burst Read Partially-defragmented data, which fits into a parallel retrieval mechanism

FIG. 5

STORAGE SYSTEM AND METHOD FOR ENABLING PARTIAL DEFRAGMENTATION PRIOR TO READING IN BURST MODE

BACKGROUND

A storage system can be used to store data from a host. The host can request that the storage system store the data in a logical address, and the storage system can maintain a logical-to-physical address table to correlate logical and physical addresses. The storage system can implement data management algorithms, which can move the data to a different physical address than the one in which the data was initially stored. This can result in fragmentation of the memory, and the storage system can perform a garbage collection operation to defragment the memory.

DETAILED DESCRIPTION

Overview

By way of introduction, the below embodiments relate to a storage system and method for enabling partial defragmentation. In one embodiment, a storage system is provided comprising a memory and a controller. The controller is configured to receive an indication from a host that the host will be reading from a portion of the memory in a burst mode; determine whether a fragmentation level of the portion of the memory is above a threshold; and in response to determining that the fragmentation level of the portion of the memory is above the threshold, perform a defragmentation of the portion of the memory prior to reading data stored in the portion of the memory.

In some embodiments, the controller is further configured to perform the defragmentation only of the portion of the memory and not of other portions of the memory in response to determining that the fragmentation level of the portion of the memory is above the threshold.

In some embodiments, the controller is further configured to receive, from the host, a logical block address of the portion of the memory.

In some embodiments, the controller is further configured to determine the fragmentation level based on a logical-to-physical address map.

In some embodiments, the defragmentation of the portion of the memory comprises moving valid data stored in the portion of the memory to another location.

In some embodiments, the another location comprises a single-level cell (SLC) cache.

In some embodiments, data is read sequentially in the another location.

In some embodiments, the memory comprises a three-dimensional memory.

In another embodiment, a method is provided that is performed in a host in communication with a storage system comprising a memory. The method comprises determining to request a high-speed read mode to read data stored in the memory; requesting the storage system use the high-speed read mode to read the data, wherein in the high-speed read mode, the storage system performs a defragmentation of an area of the memory storing the data prior to reading the data; and receiving the data from the storage system.

In some embodiments, the host determines to request the high-speed read mode in response to determining that the data will be read more than a threshold number of times over a time period.

In some embodiments, the host determines to use the high-speed read mode in response to previously reading the data and determining that a read performance criteria was not satisfied.

In some embodiments, in the high-speed read mode, the storage system performs the defragmentation of only the area of the memory storing the data and not of other areas of the memory.

In some embodiments, the defragmentation of the area of the memory comprises moving valid data stored in the area of the memory to another area.

In some embodiments, the defragmentation comprises some of the valid data of the requested logical regions, as the other valid data may be already in a defragmented state in the device.

In some embodiments, data is read sequentially in the another area.

In another embodiment, a storage system is provided comprising a memory; and means for determining, from host read patterns of the memory, a region of the memory in which to perform a defragmentation prior to reading data stored in the region of the memory.

In some embodiments, the defragmentation is performed only in the region of the memory and not in other regions of the memory.

In some embodiments, the defragmentation of the region of the memory comprises moving valid data stored in the region of the memory to another region of the memory.

In some embodiments, the another region of the memory comprises a single-level cell (SLC) cache.

In some embodiments, data is read sequentially in the another region in the memory.

In some embodiments, the memory comprises a three-dimensional memory.

Other embodiments are possible, and each of the embodiments can be used alone or together in combination. Accordingly, various embodiments will now be described with reference to the attached drawings.

Embodiments

Figures 1A, 1B:
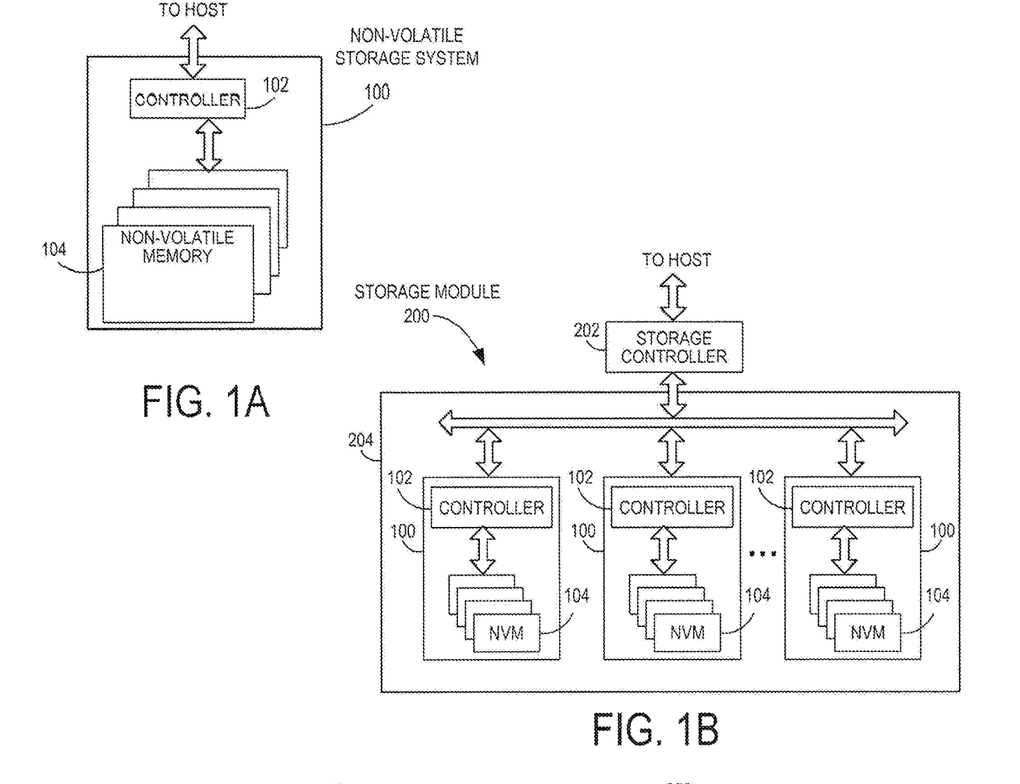
FIG. 1A is a block diagram of a non-volatile storage system of an embodiment.
FIG. 1B is a block diagram illustrating a storage module of an embodiment.
Figure 1C:
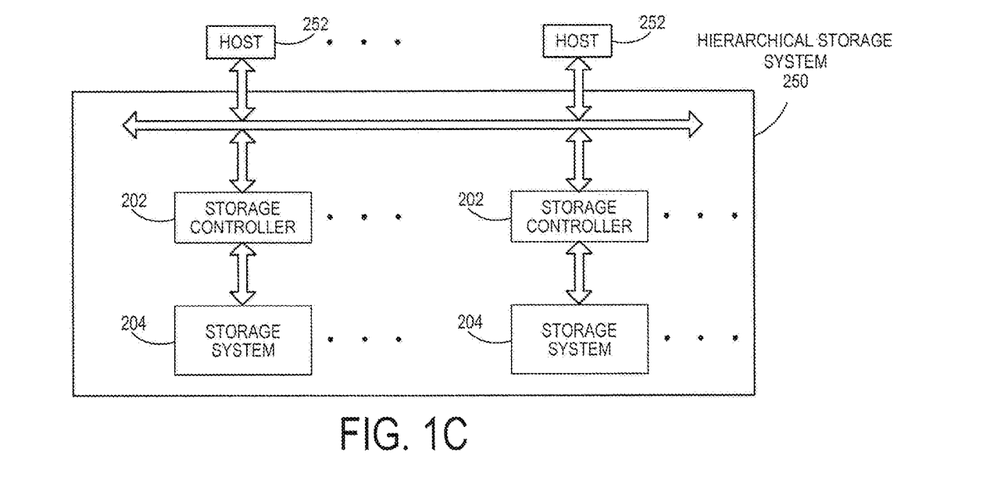
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
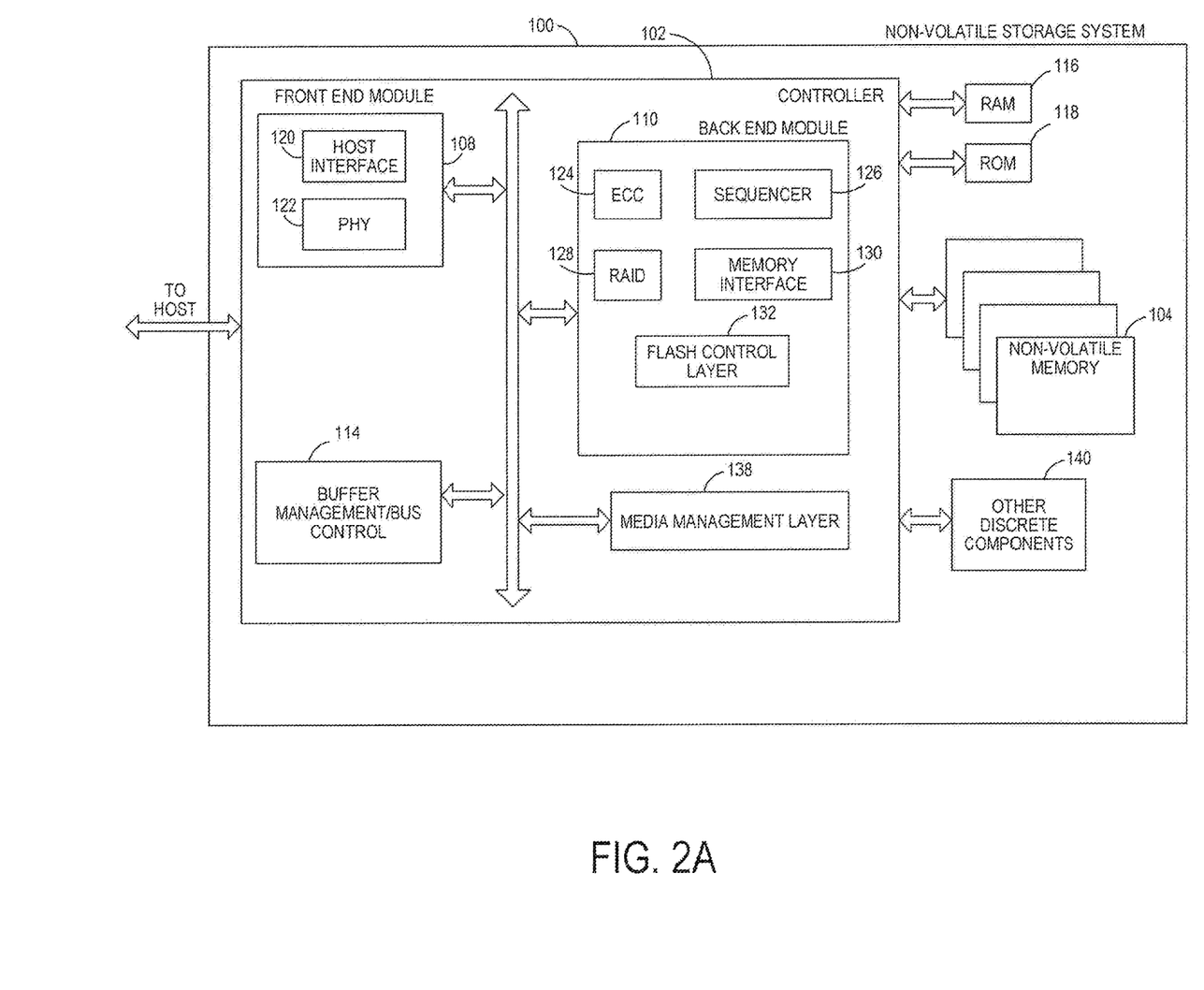
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
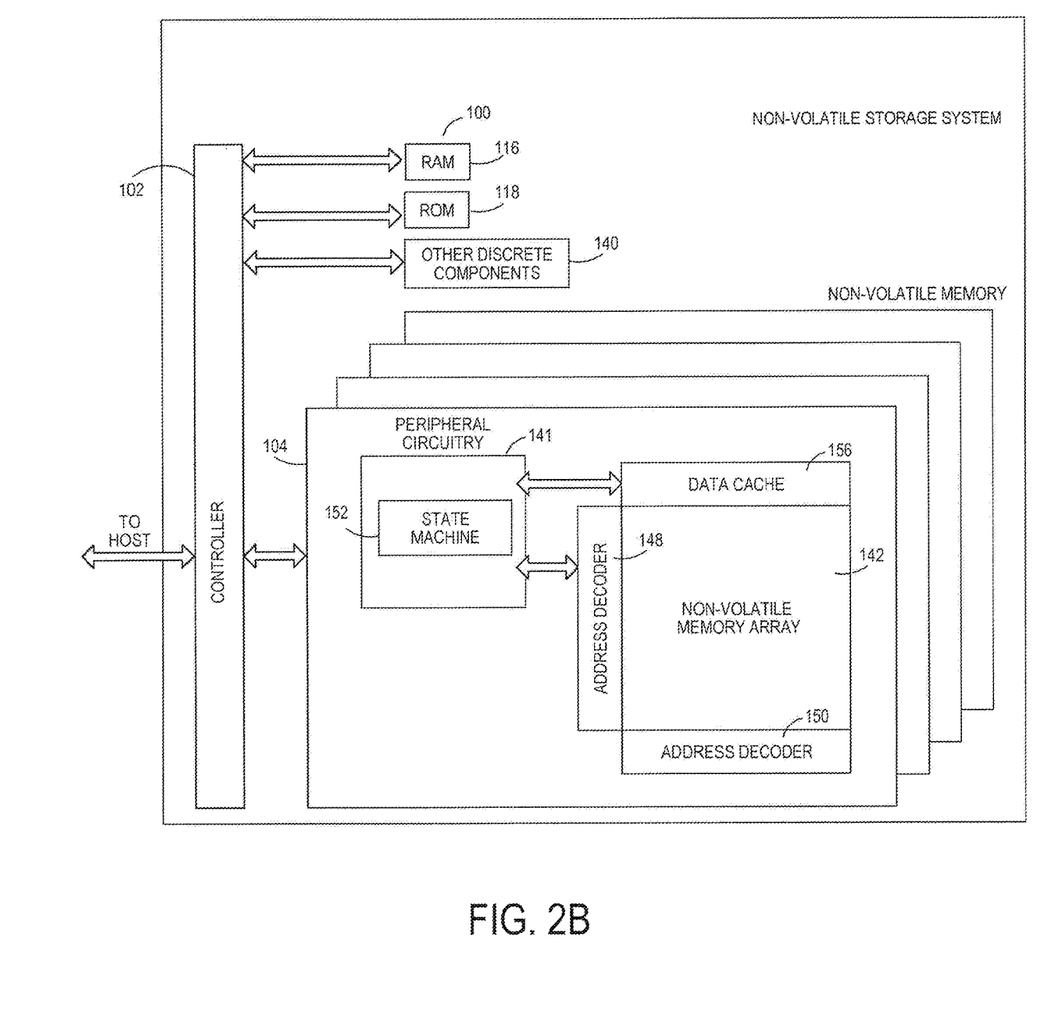
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
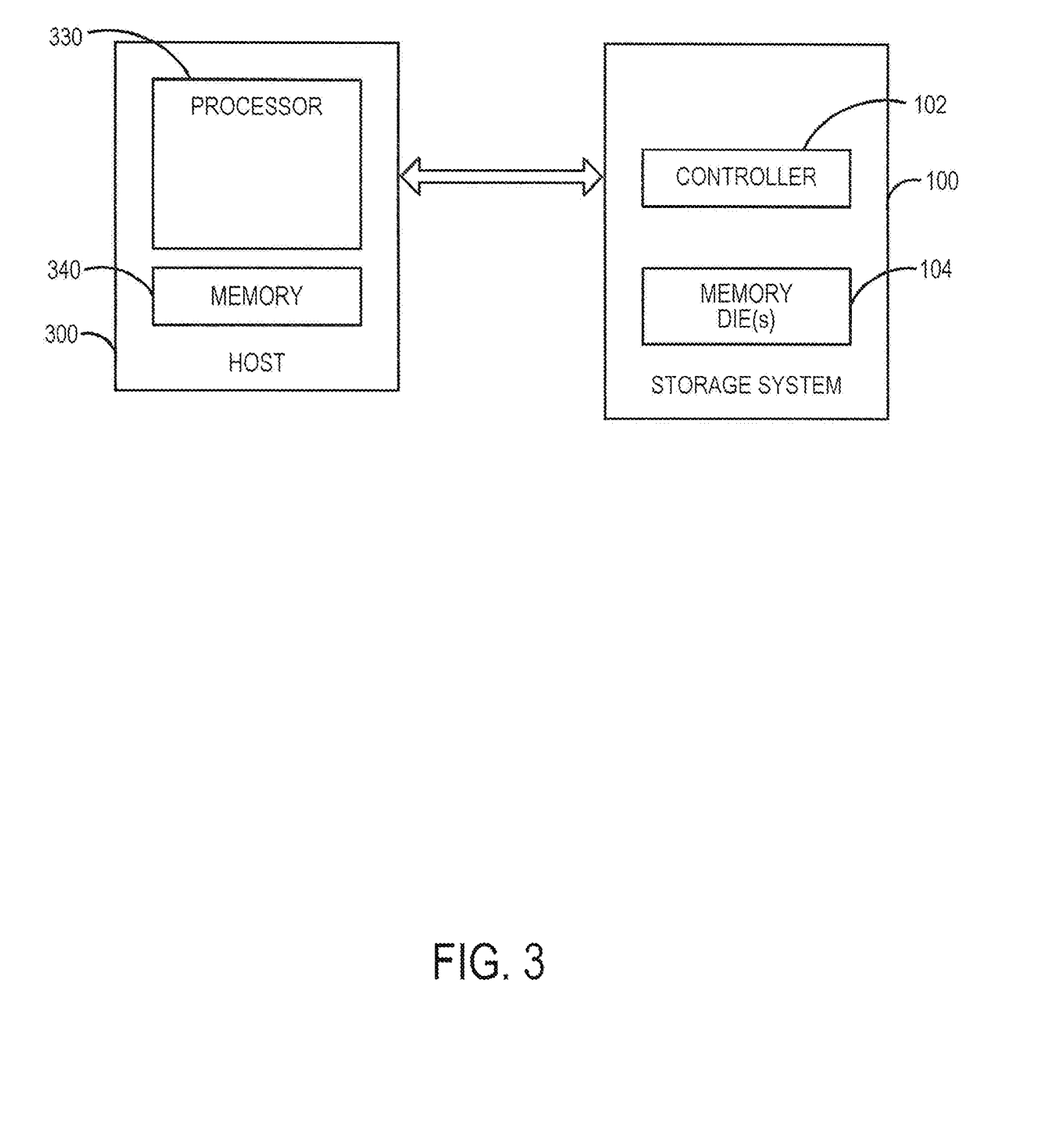
FIG. 3 is a block diagram of a host and storage system of an embodiment.

Turning again to the drawings, FIG. 3 is a block diagram of a host 300 and storage system (sometimes referred to herein as a "device") 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to read data from and write data to the storage system 100, as well as perform at least the functions described herein 100.

As mentioned above, the host 300 can request that the storage system 100 store data in a logical address, and the storage system 100 can maintain a logical-to-physical address table to correlate logical and physical addresses. The storage system 100 can implement data management algorithms, which can move the data to a different physical address in the memory 104 than the one in which the data was initially stored.

Ideally, the storage system 100 would read data stored in the memory 104 in a sequential manner, as reading data sequentially is more efficient than reading data non-sequentially, which is the case when the memory 104 has a high fragmentation level. The storage system 100 can perform periodic garbage collection operations to defragment the entire or large portions of the memory 104. However, by the time the data is to be read from the memory 104, the memory 104 can be fragmented again, leading to a non-sequential read of the data.

These embodiments can be used to address this situation. In one embodiment, the host 300 provides an indication or request to the storage system 100 (sometimes referred to herein as "the device") that it wants to read data using a high-speed read or "burst" mode. A burst mode usually refers to a high-speed write operation in which the storage system 100 streams data from the host 300 into the fastest blocks of the memory 104. For example, burst mode can be used when writing a series of "continuous click" images from a digital camera. In burst mode, the storage system's controller 102 can provide minimal or no garbage collection or other optimizations (e.g., reserving blocks, priority caching of control pages, etc.). The intention in burst mode is to make sure that the writes to the memory 104 are performed in the fastest possible manner.

Figure 4A:
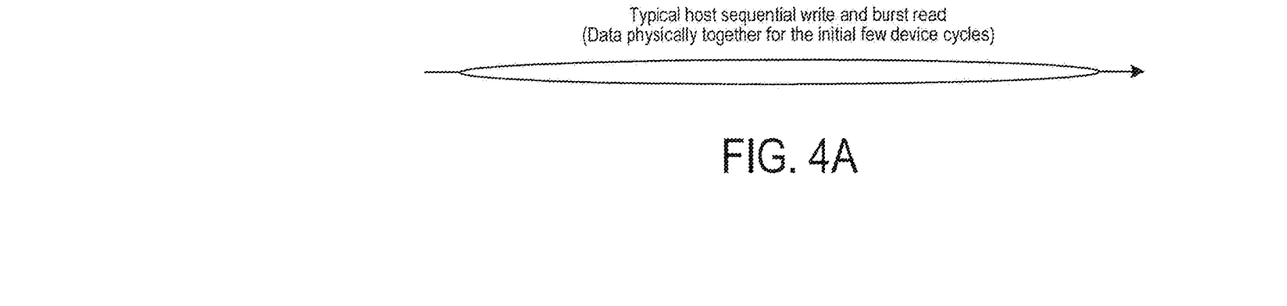
FIGS. 4A, 4B, and 4C are illustrations of data fragmentation and defragmentation of an embodiment.
Figure 4B:
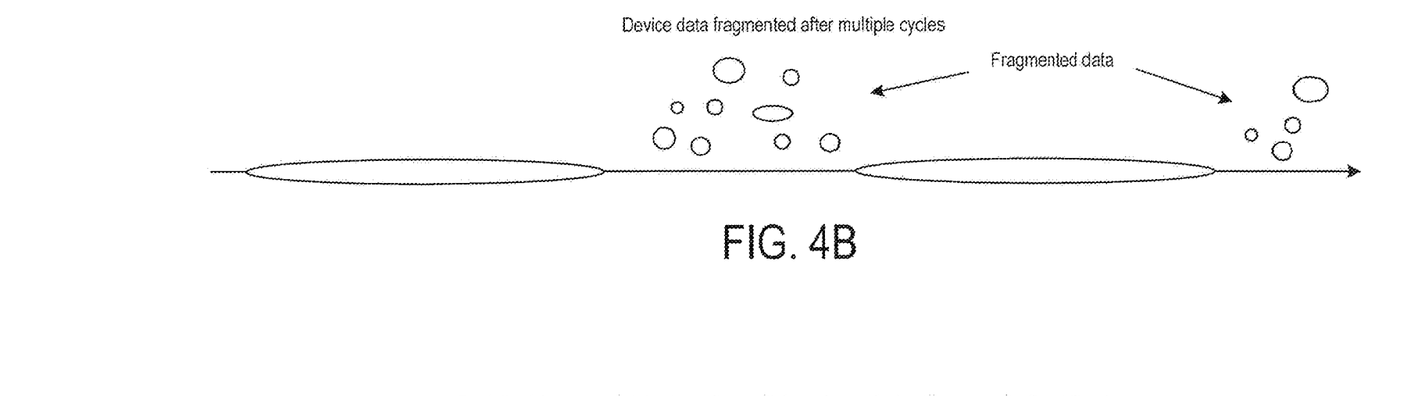
Figure 4C:
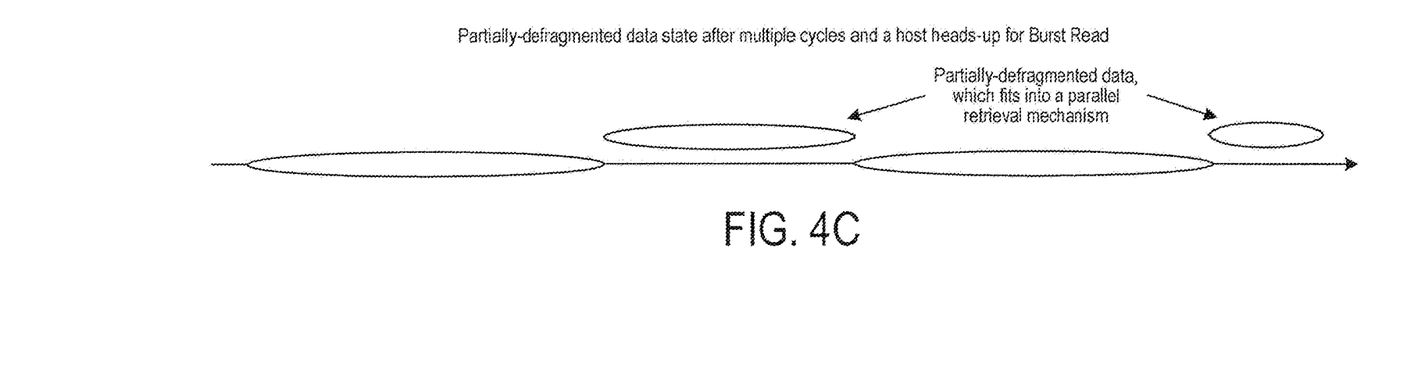

These embodiments provide a "burst read mode," which is a high-speed way of reading data (sequentially) from the memory 104. Usually, sequential reads (providing burst performance) are achieved only during the initial device cycles and not further. This is illustrated in FIGS. 4A and 4B. FIG. 4A is an illustration of a typical host sequential write and read burst, when data is physically together during initial device cycles. As shown in FIG. 4B, after multiple cycles, the data becomes fragmented. The following embodiments can be used to provide burst read after the initial device cycles using a value-based overhead work determination to partially defragment the data after multiple cycles (see FIG. 4C). This embodiment will now be described in conjunction with the flow chart 500 in FIG. 5.

Figure 5:
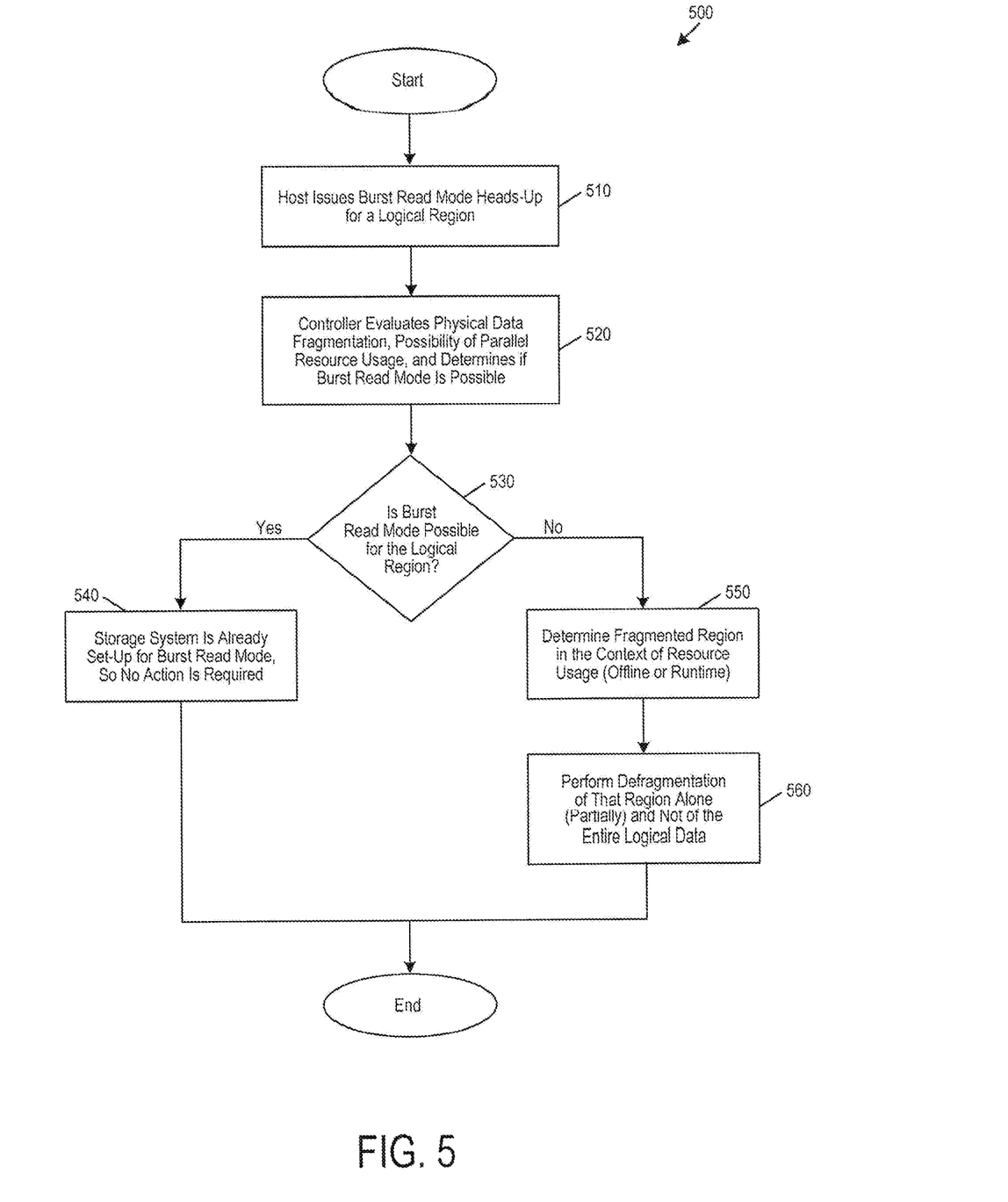
FIG. 5 is a method of an embodiment for enabling partial defragmentation.

As shown in FIG. 5, the host 300 gives the storage system 100 a heads-up on the logical data (identified by a logical block address) it intends to read in burst read mode (act 510). In response to receiving the burst read mode request from the host 300, the controller 102 in the storage system 100 determines a fragmentation level of the portion of the memory 104 that stores the requested data (act 520). The controller 102 can determine the fragmentation level based on a logical-to-physical address map. The controller 102 then determines if the fragmentation level is below a threshold or fragmentation limit (which can be predetermined or provided by the host 300) (act 530).

If the fragmentation level is below the threshold or fragmentation limit, this would indicate that the read operation would be sufficiently fast (e.g., that the data is already physically sequential or is fragmented but within a limit where the controller 102 can still use its resources in parallel), so the controller 102 would not take any special action (act 540). However, if the fragmentation level is above a threshold or fragmentation limit, this would indicate that the read operation would not be sufficiently fast, as the storage system 100 may not be able to leverage its parallel resources. In this case, the controller 102 can identify the portion of the memory 104 attempted to be read (act 550) and perform a defragmentation of that portion prior to reading the data (act 560). By performing partial defragmentation of that portion alone, maximum parallel resource usage may be possible across the entire requested region.

For example, the controller 102 can move valid data stored in the portion of the memory 104 to another location, such as a permanent or temporary single-level cell (SLC) cache or another location where the data can be read sequentially such that maximum parallel retrieval of the data may be possible. It should be noted that the defragmentation is only of the portion of the memory 104 that stores the data and not of other portions of the memory 104. So, this is not a general garbage collection operation to a larger area of the memory 104 but rather a targeted defragmentation of the region of the memory 104 that is requested to be read. Thus, these embodiments can provide better sequential read performance during the life of the storage system 100. Further, these embodiments can provide fast data retrieval necessary for some applications, which may not have enough internal buffering.

In one embodiment, the memory 104 is the full non-volatile memory of the storage system 100. Among this memory, the host 300 can request a portion be read (giving a heads-up). The storage system 100 can potentially defragment only a sub-portion of the host-requested portion since the other portion of the host-requested portion is already defragmented.

As illustrated by this example, burst read mode can be considered a special mode where the data retrieval rate can be well above device-rated sustained performance and closer to burst read performance (of the first cycle of the device) even during the life of the device. By performing only a partial defragmentation to satisfy a read performance (and not a defragmentation of a larger region or the entirety of the memory 104), data is proactively moved, while making sure the overhead work is consistent with its value. In contrast, other defragmentation schemes are usually performed as a part of garbage collection to optimize overall performance from that point onward for a larger part of the memory (e.g., for the entire logical region storing data needing garbage collection). The storage system 100 can afford a lot of work under garbage collection, but performing the same amount of work for a burst read might be overkill. Typical sequential reads can guarantee burst performance only during the initial device cycles and not further.

Multiple dynamic and static garbage collection cycles can create a lot of fragmentation, such that there is no guarantee of sequentially reading data that was written sequentially. In addition, there can be patterns in retail system testing where the host writes are random and the reads are sequential. This data is expected to be fragmented outright, thus typically leading to low sequential read performances. These embodiments can assist in handling such cases as well. Further, typically, the die parallel unit is 16 KB or 32 KB. Based on die and flash channel parallel usage, the controller 102 can decide to defragment only data for parallel retrieval.

The host 300 can determine to request burst read or high-speed read in any suitable way. For example, the host 300 can determine to request the high-speed read mode in response to determining that the data will be read more than a threshold number of times over a time period (i.e., that logical data requires frequent retrieval in the near future). In this case, the controller 102 may decide to let go of the capacity copy or can have it intact (for duplication) based on the host configuration. As another example, the host 300 can determine to request the high-speed read mode in response to previously reading the data and determining that a read performance criteria was not satisfied. In this approach, the host 300 can learn from the first access of necessary logical data and use the special mode henceforth, after determining that the storage system 100 did not meet the required read performance criteria in the first place.

Further, in another embodiment, the controller 102 of the storage system 100 determines, from host read patterns of the memory 104, a region of the memory 104 in which to perform a defragmentation prior to reading data stored in the region of the memory 104. In this embodiment, the host trigger and interface are not required, as the entire method is self-sustained in the storage system 100. In these various embodiments, only some logical data is moved, as prior defragmentation work is involved, leading to write amplification and performance drops. A host heads-up can trigger necessary device work to match the required data retrieval rates during data access. It does not come free. Overhead is there, and, hence, caution is advised at the host side when using this feature. Thus, the host 300/storage system 100 can utilize this burst read feature cautiously, on an as-needed basis, similar to typical write burst mode use cases.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:
1. A storage system comprising:
a memory comprising a plurality of memory dies; and
a controller configured to:
 receive an indication from a host that the host will be reading from a portion of the memory across the plurality of memory dies in a burst mode;

determine whether a fragmentation level of the portion of the memory is above a threshold that prevents the portion of the memory from being read in parallel across the plurality of memory dies; and in response to determining that the fragmentation level of the portion of the memory is above the threshold that prevents the portion of the memory from being read in parallel across the plurality of memory dies, perform a defragmentation targeted only to of the portion of the memory to enable the portion of the memory to be read in parallel across the plurality of memory dies, wherein defragmentation is not performed in other portions of the memory.

2. The storage system of claim 1, wherein the controller is further configured to receive, from the host, a logical block address of the portion of the memory.

3. The storage system of claim 1, wherein the controller is further configured to determine the fragmentation level based on a logical-to-physical address map.

4. The storage system of claim 1, wherein the defragmentation of the portion of the memory comprises moving valid data stored in the portion of the memory to another location.

5. The storage system of claim 4, wherein the another location comprises a single-level cell (SLC) cache.

6. The storage system of claim 1, wherein data is read sequentially in the another location.

7. The storage system of claim 1, wherein the memory comprises a three-dimensional memory.

8. The storage system of claim 1, wherein the host is configured to send the indication in response to previously reading data stored in the portion of the memory and determining that a read performance criterion was not satisfied.

9. The storage system of claim 1, wherein the host is configured to send the indication in response to previously reading data stored in the portion of the memory and determining that a read performance criterion was not satisfied.

10. The storage system of claim 1, wherein the storage system is configured to be integrated in the host.

11. A method comprising:
performing the following in a host in communication with a storage system comprising a memory comprising a plurality of memory dies:
determining to request a high-speed read mode to read data stored in the memory across the plurality of memory dies;
requesting the storage system read the data using the high-speed read mode, wherein in the high-speed read mode, the storage system performs a defragmentation targeted only to an area of the memory storing the data prior to reading the data to enable the area of the memory to be read in parallel across the plurality of memory dies, wherein defragmentation is not performed in other areas of the memory; and
receiving the data from the storage system.

12. The method of claim 11, wherein the host determines to request the high-speed read mode in response to determining that the data will be read more than a threshold number of times over a time period.

13. The method of claim 12, wherein the host determines to use the high-speed read mode in response to previously reading the data and determining that a read performance criteria was not satisfied.

14. The method of claim 12, wherein the defragmentation of the area of the memory comprises moving valid data stored in the area of the memory to another area.

15. The method of claim 14, wherein data is read sequentially in the another area.

16. The method of claim 14, wherein the another area comprises a single-level cell (SLC) cache.

17. The method of claim 11, further comprising sending a logical block address of the area of the memory to the storage system.

18. The method of claim 11, wherein the storage system is configured to determine a fragmentation level based on a logical-to-physical address map.

19. The method of claim 11, wherein the memory comprises a three-dimensional memory.

20. A storage system comprising:
a memory;
means for receiving an indication from a host that the host will read from a portion of the memory across a plurality of memory dies in a burst mode;
means for determining whether a fragmentation level of the portion of the memory exceeds a threshold that prevents the portion of the memory from being read in parallel across the plurality of memory dies; and
means for performing a defragmentation targeted to only the portion of the memory to enable the portion of the memory to be read in parallel across the plurality of memory dies, wherein defragmentation is not performed in other portions of the memory, in response to determining that the fragmentation level of the portion of the memory exceeds the threshold that prevents the portion of the memory from being read in parallel across the plurality of memory dies.

* * * * *